(12) United States Patent  
Gredinberg et al.

(10) Patent No.: US 7,980,764 B2  
(45) Date of Patent: Jul. 19, 2011

(54) THROUGH-SHAFT FLUID RECIRCULATION FOR A SPINDLE MOTOR

(75) Inventors: Alexander Gredinberg, San Jose, CA (US); Sanjay C. Sheth, Saratoga, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 580 days.

(21) Appl. No.: 12/163,977

(22) Filed: Jun. 27, 2008

(65) Prior Publication Data

US 2009/0324150 A1 Dec. 31, 2009

(51) Int. Cl.
*F16C 32/06* (2006.01)
(52) U.S. Cl. ......... 384/107; 384/100; 384/119; 384/132
(58) Field of Classification Search .................. 384/100, 384/107, 114, 119, 132; 360/99.08, 98.07
See application file for complete search history.

(56) References Cited

U.S. PATENT DOCUMENTS

| | | | |
|---|---|---|---|
| 5,715,116 A * | 2/1998 | Moritan et al. ............ 360/99.08 |
| 2003/0231813 A1* | 12/2003 | Gomyo et al. ................ 384/107 |
| 2004/0161182 A1* | 8/2004 | Kusaka et al. ................ 384/107 |
| 2006/0039635 A1* | 2/2006 | Schmid .......................... 384/100 |
| 2008/0260310 A1* | 10/2008 | Bauer et al. ................... 384/107 |
| 2008/0273822 A1* | 11/2008 | Le et al. ......................... 384/107 |
| 2009/0309439 A1* | 12/2009 | Yamamoto .................... 384/107 |

* cited by examiner

*Primary Examiner* — Thomas R Hannon

(57) ABSTRACT

An apparatus and method are described for a fluid dynamic bearing motor as may be utilized in a disc drive memory system. A fluid seal is situated at a first axial end of a bearing, and a grooved pumping seal is situated at a second axial end of the bearing. In an aspect, a fluid recirculation passageway is defined through a shaft and a thrustplate, to recirculate fluid from axially above the grooved pumping seal at the second axial end of the bearing to the first axial end of the bearing. Any air ingested at the grooved pumping seal, or which came out of solution from the fluid, is purged into a fluid reservoir and out the fluid seal. In an aspect, fluid is recirculated from the center of the journal bearing and the bearing pressure grooves to the fluid recirculation passageway and toward an air purging fluid seal.

20 Claims, 3 Drawing Sheets

THROUGH-SHAFT FLUID RECIRCULATION FOR A SPINDLE MOTOR

BACKGROUND

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified.

Disc drives presently utilize a spindle motor having a fluid dynamic bearing (FDB) situated between a shaft and sleeve to support a hub and a disc for rotation. In a hydrodynamic bearing, a lubricating fluid is provided between a fixed member bearing surface and a rotating member bearing surface of the disc drive. Because the two surfaces which form the gap of the hydrodynamic bearing are not mechanically separated, the potential for surface impact exists. Such impacts could occur when the motor supported by the bearing is at rest, or even more damaging, when a shock to the system occurs while the motor is either stopped or spinning. Over time, such impacts could wear down a region on one of the bearing surfaces, altering the pressure distribution and reducing bearing efficiency or induce catastrophic failure due to surface damage like galling. Moreover, particles could be generated by the scraping of one side against the other, which particles would continue to be carried about by the fluid. Such particles could build up over time, scraping the surfaces which define the hydrodynamic bearing, or being expelled into the region surrounding the motor where they could easily damage the disc recording surface.

Air bubbles are also a concern in the case of hydrodynamic bearings, since air bubbles may cause fluid pressure inconsistencies within the hydrodynamic bearing. Further, during operation, the air bubbles may expand, reducing the average viscosity of the hydrodynamic bearing fluid increasing wobble or run-out between the rotating and fixed members. More specifically, in fluid dynamic bearings, an important goal is low non-repeatable runout (NRR) to optimize tracking and track density. In a fluid dynamic bearing motor, one potential source of NRR is the presence of air in the grooved regions of the bearing, causing lubricant pressure instability and consequential rotor displacement. The presence of air in the bearing lubricant can result from air ingestion due to a combination of conditions including thermal contraction of the lubricant and part tolerances such as cylindrical taper in a journal bearing or symmetrically formed bearing grooves. Due to the lubricant's tendency to flow throughout the bearing due to pressure gradients caused by part tolerances, air bubbles can be swept into the grooved regions of the bearing, resulting in NRR events.

SUMMARY

An apparatus and method are provided for a fluid dynamic bearing motor. A fluid dynamic bearing is defined between an inner component and an outer component, wherein the inner component and the outer component are positioned for relative rotation. A fluid seal is situated at a first axial end of the bearing, and a grooved pumping seal is situated at a second axial end of the bearing. A fluid recirculation passageway is defined by the inner component, and extends from axially above the grooved pumping seal at the second axial end of the bearing to the first axial end of the bearing, for recirculating fluid from the second axial end of the bearing through the recirculation passageway to the first axial end of the bearing, and for purging any air out the fluid seal, which is ingested at the grooved pumping seal or which came out of solution from the fluid. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus and method are described herein for a fluid dynamic bearing motor as may be utilized in a disc drive memory system. A fluid seal is situated at an upper axial end of a bearing, and a grooved pumping seal is situated at a lower axial end of the bearing. In an embodiment, a low cost fluid recirculation passageway is defined through a shaft and a thrustplate, to recirculate fluid from axially above the grooved pumping seal at the lower axial end of the bearing to the upper axial end of the bearing. Any air ingested at the grooved pumping seal, or which came out of solution from the fluid, is purged into a fluid reservoir and out the fluid seal. In an embodiment, fluid is recirculated from the center of the journal bearing and the bearing pressure grooves to the fluid recirculation passageway and toward an air purging fluid seal. The need to utilize an expensive diamond-like coating (DLC) applied to relatively rotatable facing surfaces to help reduce wear is reduced or eliminated.

It will be apparent that features of the discussion and claims may be utilized with disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 240 of shaft 220 shown in FIG. 2), and "radially" or "radial direction" refers to a direction perpendicular to the centerline axis 240, and passing through centerline axis 260. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures as described in this Description and should not be construed as limiting.

Figure 1:
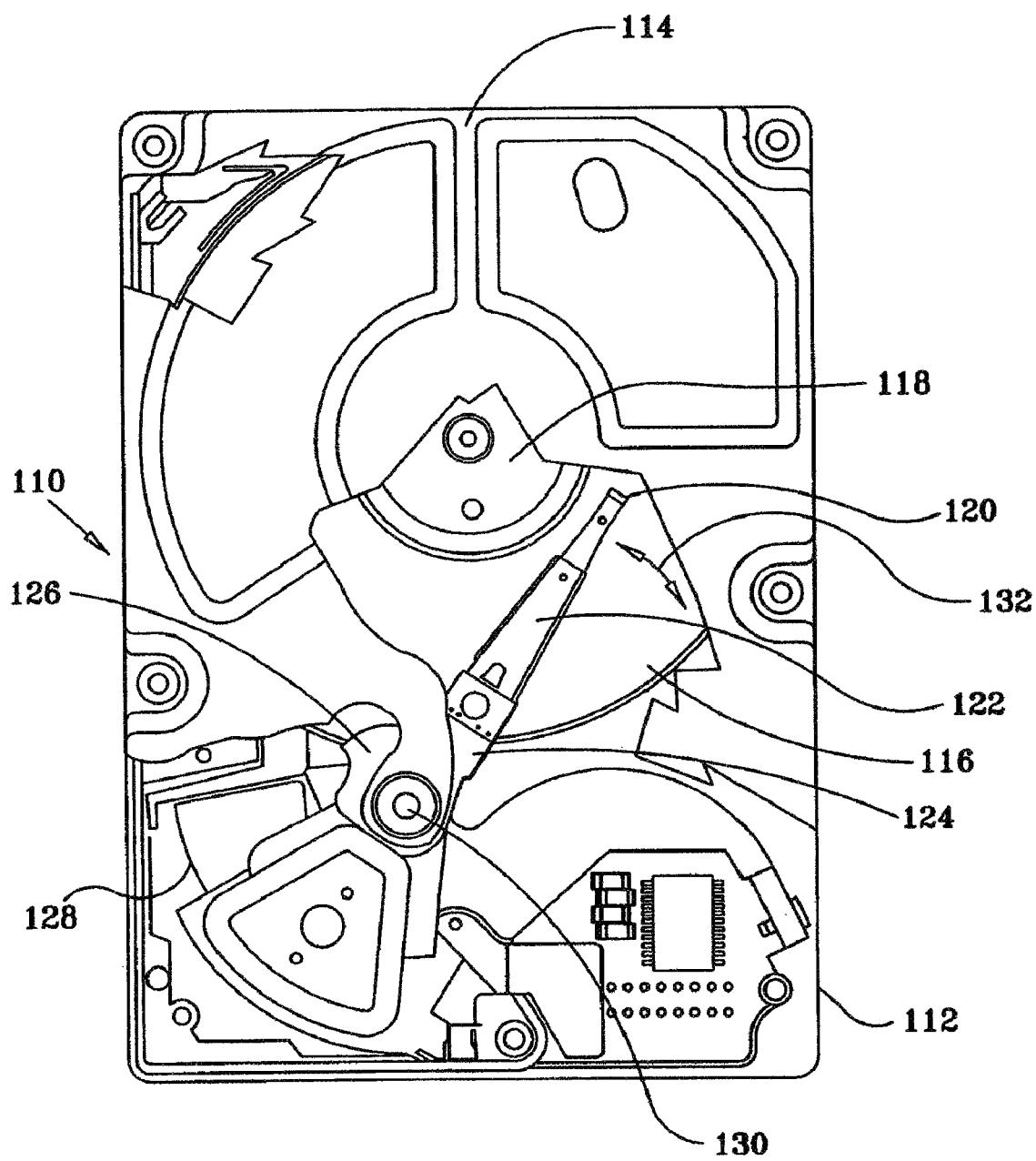
FIG. 1 is a top plan view of a disc drive data storage system in which the present invention is useful, in accordance with an embodiment of the present invention.

Referring to the drawings wherein identical reference numerals denote the same elements throughout the various views, FIG. 1 illustrates a top plan view of a typical disc drive data storage system 110 in which the present invention is useful. Clearly, features of the discussion and claims are not limited to this particular design, which is shown only for purposes of the example. Disc drive 110 includes base plate 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
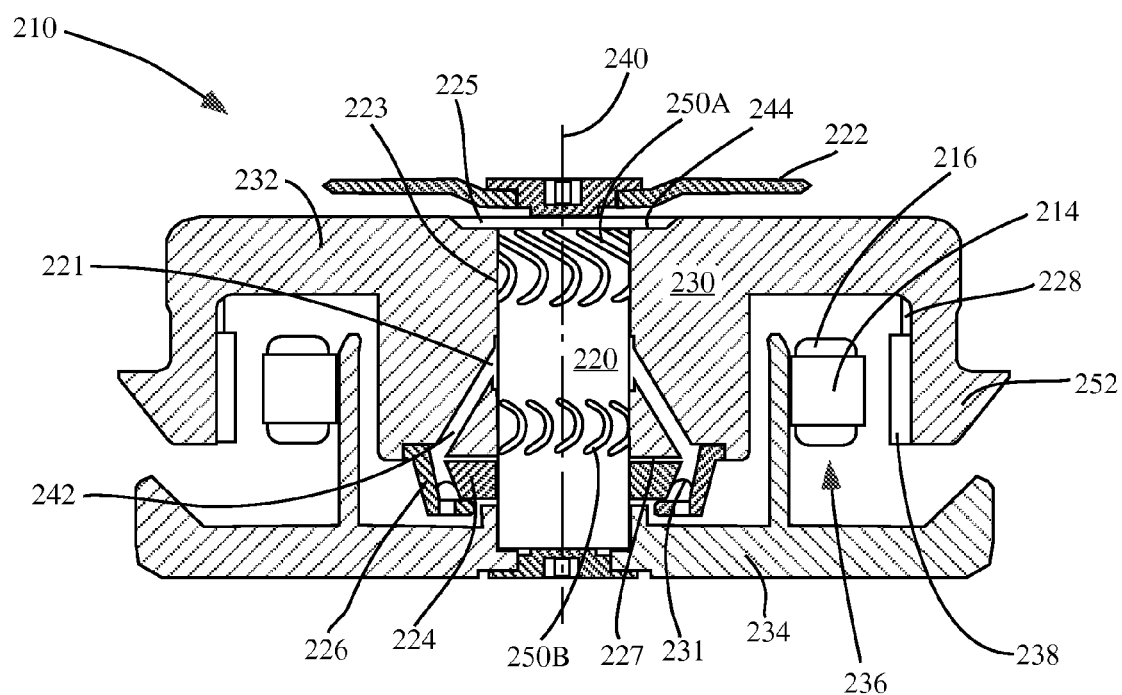
FIG. 2 is a sectional side view of a contemporary fluid dynamic bearing motor used in a disc drive data storage system, incorporating a rotatable sleeve having a fluid recirculation passageway extending therethrough.

Referring to FIG. 2, a sectional side view is illustrated of a contemporary fluid dynamic bearing motor 210, incorporating a rotatable sleeve having a fluid recirculation passageway therethrough, as used in a disc drive data storage system 110. This fluid dynamic bearing motor 210 includes a rotatable component that is relatively rotatable about a stationary component, defining a journal bearing 223 therebetween. In this example, the rotatable components include sleeve 230 and hub 232. Hub 232 includes a disc flange, which supports disc pack 116 (shown in FIG. 1) for rotation about axis 240 of shaft 220. Sleeve 230 and hub 232 are integral with backiron 228. One or more magnets 238 are attached to a periphery of backiron 228. The magnets 238 interact with a lamination stack 214 attached to the base 234 to cause the hub 232 to rotate. Magnet 238 can be formed as a unitary, annular ring or can be formed of a plurality of individual magnets that are spaced about the periphery of hub 232. Magnet 238 is magnetized to form one or more magnetic poles. Hub 232 also includes a disc flange 252, which supports disc pack 116 (shown in FIG. 1) for rotation about shaft 220. The stationary components include shaft 220 and stator 236 (lamination stack 214 and coil 216), which are affixed to base plate 234. Top cover 222, thrustplate 224, and a second radially extending plate 225 are attached to shaft 220. Bearing 223 is established between the shaft 220 and the rotating sleeve 230.

A thrust bearing 227 is established between facing surfaces of thrustplate 224 and sleeve 230. Thrust bearing 227 provides an upward force on hub 232 to counterbalance the downward forces including the weight of hub 232, axial forces between magnet 238 and base plate 234, and axial forces between stator lamination stack 214 and magnet 238. The second radially extending plate 225 is positioned at an axially opposite end of the shaft 220. A pumping seal 244 is utilized to contain fluid within the journal bearing 223 at the top of the shaft 220, and pump fluid inward toward journal bearing 223. In the case of a fluid dynamic bearing motor, a fluid, such as lubricating oil fills the interfacial regions between shaft 220 and sleeve 230, as well as between other stationary and rotatable components.

Grooves 250A and 250B are situated on shaft 220 for establishing pressure at both axial ends of the journal bearing 223. Top grooves 250A are formed with an asymmetric leg forcing fluid to flow down the bearing 223. A separator region 221 is situated between grooves 250A and 250B. Fluid recirculation passageway 242 is formed through the sleeve 230 extending from the separator region 221 to the bottom of the sleeve 230. A shield 226 is attached to the bottom of sleeve 230 and a capillary seal 231 is formed extending from thrustplate 224 to shield 226 for containing fluid with the journal bearing 223 at the bottom of shaft 220. Fluid flows through fluid passageway 242 to the outer diameter of the thrustplate 224, and then up journal bearing 223 to separator region 221. A diamond-like coating (DLC) coating is applied to the shaft 220 to help reduce wear to facing surfaces of the shaft 220 and sleeve 230, during surface-to-surface impact.

Figure 3:
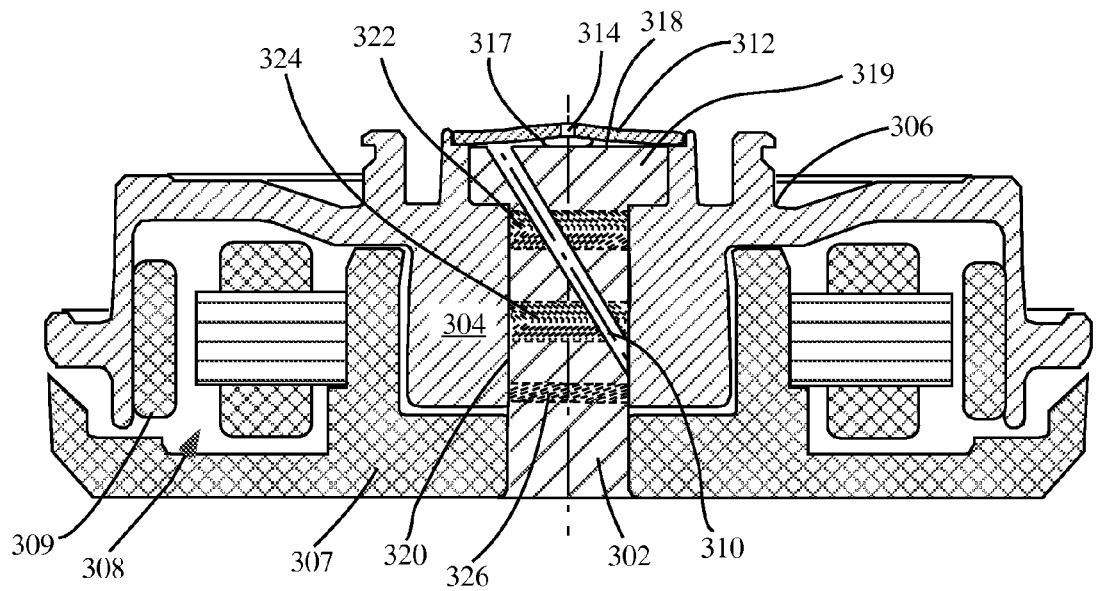
FIG. 3 is a sectional view of a fluid dynamic bearing motor as can be used in a disc drive data storage system, employing a shaft having a fluid recirculation passageway extending therethrough, in accordance with an embodiment of the present invention.

Turning now to FIG. 3, a sectional view is shown of a fluid dynamic bearing motor as can be used in a disc drive data storage system as in FIG. 1. A bearing 320 is defined between an inner component shaft 302 and an outer component sleeve 304, wherein the shaft 302 and the sleeve 304 are positioned for relative rotation. The stationary components include baseplate 307, stator 308, shaft 302, and thrustplate 319. The rotatable components include sleeve 304, hub 306 and magnet 309. Thrustplate 319 extends from the shaft 302 at the top axial end of bearing 320. Thrustplate 319 may be an integral component with shaft 302, or may be formed independently of, and joined to shaft 302, for example by press fit. A shield 312, extending from sleeve 304, has a surface facing the thrustplate 319 to define a fluid reservoir gap 318 therebetween. The shield 312 also acts as a limiter, limiting downward axial motion of the hub 306. A fluid seal 317 is situated at the top axial end of the bearing 320, and a grooved pumping seal 326 is situated at a bottom axial end of the bearing 320. In an embodiment, the fluid seal 317 is a capillary seal, formed by a fluid meniscus extending from a surface of a shield 312 to a facing surface of a thrustplate 319. Other fluid seals, as known by those skilled in the art, may alternatively be employed. While the present figure is described herein with a lubricating fluid, those skilled in the art will appreciate that useable fluids include a liquid, a gas, or a combination of a liquid and gas.

Shaft 326 defines a fluid recirculation passageway 310 extending therethrough. In this example embodiment, the fluid recirculation passageway 310 further extends through the thrustplate 319, and opens at the top axial end of the bearing 320 to the fluid reservoir gap 318. In an alternative design, when a thrustplate is not utilized at the top of a shaft, the present invention fluid reservoir passageway extends through the shaft, and opens at the top axial end of the shaft to the top axial end of the bearing adjacent to a fluid seal.

The fluid recirculation passageway 310 extends from axially above the grooved pumping seal 326 at the lower axial end of the bearing to the top axial end of the bearing. The fluid recirculation passageway 310 provides a passageway to recirculate fluid from the lower axial end of the bearing, through the recirculation passageway 310, to the top axial end of the bearing. The fluid recirculation passageway 310 also provides a passageway to purge any air out the fluid seal 317 to injection hole 314, which is ingested at the grooved pumping seal 326 or which came out of solution from the fluid.

Upper bearing pressure grooves 322 and lower bearing pressure grooves 324 are formed on at least one of a facing surface of the shaft 302 and the sleeve 304. In an embodiment, the fluid recirculation passageway opening at the lower axial end of the bearing is positioned axially between the grooved pumping seal 326 and the lower bearing pressure grooves 324.

Also, as shown in FIG. 3, the fluid recirculation passageway 310 extends from a first (right) radial side of the lower axial end of the bearing to a second (left) radial side of the top axial end of the bearing. Alternatively, the fluid recirculation passageway extends from the lower axial end of the bearing to the top axial end of the bearing, having fluid openings on the same radial side of the bearing; for example, extending from a right radial side of the lower axial end of the bearing to the right radial side of the top axial end of the bearing.

Figure 4:
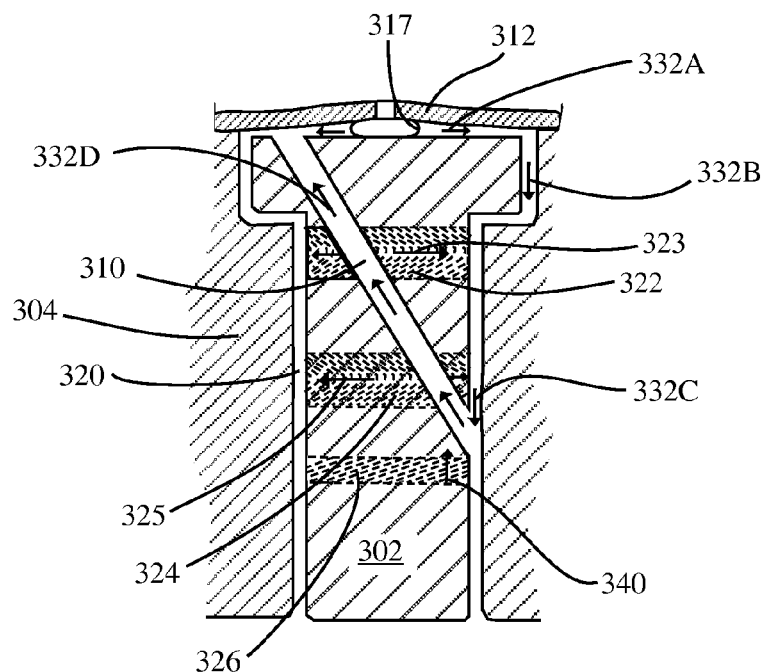
FIG. 4 is an enhanced sectional side view of a portion of the fluid dynamic bearing motor as in FIG. 3, wherein bearing pressures, fluid pumping, and fluid flow is illustrated, in accordance with an embodiment of the present invention.

FIG. 4 illustrates an enhanced sectional side view of a portion of the fluid dynamic bearing motor as in FIG. 3, wherein bearing pressures, fluid pumping, and fluid flow is illustrated, in accordance with an embodiment of the present invention. Grooved pumping seal 326 provides a fluid seal at the bottom axial end of bearing 320. Fluid is pumped axially up, in pumping direction 340, toward fluid recirculation passageway 310. On the opposite axial end of the journal bearing 320, fluid seal 317 (optionally a capillary seal) retains fluid with the journal bearing 320. Fluid flows outward at direction 332A due to centrifugal force, and downward in direction 332B. Upper bearing grooves 322 and lower bearing grooves 324 are formed on at least one of a facing surface of the shaft 302 and the sleeve 304. These grooves provide locations of higher pressure with journal bearing, separating shaft 304 from sleeve 302 as shown by the pressure arrows 323 and 325. Fluid flows in direction 332C at the center of journal bearing 320, and into fluid recirculation passageway 310, as shown by fluid flow direction 332D.

As compared with the conventional motor shown in FIG. 2, an embodiment of the present invention provides a fluid passageway to recirculate fluid from an axial end of the journal bearing (having a grooved pumping seal) to an opposite axial end of the journal bearing (adjacent a fluid seal), to purge any air bubbles from the fluid. Whereas, in the conventional design shown in FIG. 2, pumping seal 244 at the top of the shaft 220 pumps fluid directly toward the center of the journal bearing and through bearing pressure grooves 250A, potentially causing fluid pressure inconsistencies within the hydrodynamic bearing, and increasing wobble or run-out between the stationary and rotating components. Thereafter, the fluid passes through the conventional fluid recirculation passageway 242.

Modifications and variations may be made to the disclosed embodiments while remaining within the spirit and scope of the invention. The implementations described above and other implementations are within the scope of the following claims.

We claim:
1. A fluid dynamic bearing motor comprising:
   a bearing defined between an inner component and an outer component, wherein the inner component and the outer component are positioned for relative rotation;
   a fluid seal situated at a first axial end of the bearing;
   a grooved pumping seal situated at a second axial end of the bearing; and
   a fluid recirculation passageway defined by the inner component, and extending from axially above the grooved pumping seal at the second axial end of the bearing to the first axial end of the bearing, for recirculating fluid from the second axial end of the bearing through the recirculation passageway to the first axial end of the bearing, and for purging any air out the fluid seal, which is ingested at the grooved pumping seal or which came out of solution from the fluid.

2. The fluid dynamic bearing motor as in claim 1, further comprising upper bearing pressure grooves and lower bearing pressure grooves formed on at least one of a facing surface of the inner component and the outer component, wherein the fluid recirculation passageway opening at the second axial end of the bearing is positioned axially between the grooved pumping seal and the lower bearing pressure grooves.

3. The fluid dynamic bearing motor as in claim 1, further comprising a thrustplate extending from the inner component at the first axial end of the bearing, wherein the inner component comprises a shaft.

4. The fluid dynamic bearing motor as in claim 3, further comprising a shield extending from the outer component having a surface facing the thrustplate, and defining a fluid reservoir gap therebetween.

5. The fluid dynamic bearing motor as in claim 4, wherein the fluid seal is a capillary seal, formed by a fluid meniscus extending from the shield surface to a facing thrustplate surface.

6. The fluid dynamic bearing motor as in claim 5, wherein the fluid recirculation passageway is further defined through the thrustplate, and opens at the first axial end of the bearing to the fluid reservoir gap.

7. The fluid dynamic bearing motor as in claim 1, wherein the inner component is a stationary shaft, and the outer component comprises a rotatable sleeve.

8. The fluid dynamic bearing motor as in claim 1, wherein the fluid recirculation passageway extends from a first radial side of the second axial end of the bearing to a second radial side of the first axial end of the bearing.

9. A disc drive memory system comprising:
a fluid dynamic bearing defined between an inner component and an outer component, wherein the inner component and the outer component are positioned for relative rotation;
a data storage disc attached to one of the inner component and the outer component, and an actuator supporting a head proximate to the data storage disc for communicating with the data storage disc;
a fluid seal situated at a first axial end of the bearing;
a grooved pumping seal situated at a second axial end of the bearing; and
a fluid recirculation passageway defined by the inner component, and extending from axially above the grooved pumping seal at the second axial end of the bearing to the first axial end of the bearing, for recirculating fluid from the second axial end of the bearing through the recirculation passageway to the first axial end of the bearing, and for purging any air out the fluid seal, which is ingested at the grooved pumping seal or which came out of solution from the fluid.

10. The disc drive memory system as in claim 9, further comprising upper bearing pressure grooves and lower bearing pressure grooves formed on at least one of a facing surface of the inner component and the outer component, wherein the fluid recirculation passageway opening at the second axial end of the bearing is positioned axially between the grooved pumping seal and the lower bearing pressure grooves.

11. The disc drive memory system as in claim 9, further comprising a thrustplate extending from the inner component at the first axial end of the bearing, wherein the inner component comprises a shaft.

12. The disc drive memory system as in claim 11, further comprising a shield extending from the outer component having a surface facing the thrustplate, and defining a fluid reservoir gap therebetween.

13. The disc drive memory system as in 12, wherein the fluid seal is a capillary seal, formed by a fluid meniscus extending from the shield surface to a facing thrustplate surface.

14. The disc drive memory system as in claim 13, wherein the fluid recirculation passageway is further defined through the thrustplate, and opens at the first axial end of the bearing to the fluid reservoir gap.

15. The disc drive memory system as in claim 9, wherein the inner component is a stationary shaft, and the outer component comprises a rotatable sleeve.

16. The disc drive memory system as in claim 9, wherein the fluid recirculation passageway extends from a first radial side of the second axial end of the bearing to a second radial side of the first axial end of the bearing.

17. In a fluid dynamic bearing motor including a bearing defined between an inner component and an outer component, wherein the inner component and the outer component are positioned for relative rotation, a method comprising:
recirculating fluid from a first axial end of the bearing having a grooved pumping seal, through a recirculation passageway, to a second axial end of the bearing having a fluid seal; and
purging air out the fluid seal ingested at the grooved pumping seal or which came out of solution from the fluid, wherein the fluid recirculation passageway is defined by the inner component, and extends from axially above the grooved pumping seal at the first axial end of the bearing to the second axial end of the bearing.

18. The method as in claim 17, further comprising recirculating the fluid at the first axial end of the bearing from a bearing area situated between the grooved pumping seal and lower bearing pressure grooves, wherein upper bearing pressure grooves and the lower bearing pressure grooves are positioned on at least one of a facing surface of the inner component and the outer component.

19. The method as in claim 17, wherein: the inner component comprises a shaft; a thrustplate extends from the shaft at the second axial end of the bearing; a shield extends from the outer component; a fluid reservoir gap is defined between facing surfaces of the thrustplate and the shield; and a fluid meniscus capillary seal extends from the thrustplate surface to the facing shield surface.

20. The method as in claim 17, further comprising circulating the fluid from the inner component through a thrustplate, wherein the fluid recirculation passageway is further defined through the thrustplate, and wherein the thrustplate extends from the inner component at the second axial end of the bearing.

* * * * *